United States Patent [19]
Sampson et al.

[11] Patent Number: 5,533,468
[45] Date of Patent: Jul. 9, 1996

[54] HOLLOW, PLASTIC HORSE STALL GATE

[75] Inventors: Gerald A. Sampson, Santa Fe Springs; Gordon J. Sanden, Huntington Beach; Harold D. Sampson, Cypress, all of Calif.

[73] Assignee: Allen United, Santa Fe Springs, Calif.

[21] Appl. No.: 322,283

[22] Filed: Oct. 13, 1994

[51] Int. Cl.⁶ .................................. A01K 1/02; E06B 3/00
[52] U.S. Cl. .......................... 119/524; 49/501; 446/110; 446/478
[58] Field of Search ..................... 119/27, 20; 49/501, 49/386, 50, 57; 446/104, 110, 476, 478; 256/19, 26

[56] References Cited

U.S. PATENT DOCUMENTS

| | | | |
|---|---|---|---|
| 826,489 | 7/1906 | Dean | 49/386 |
| 4,357,000 | 11/1982 | Tisbo et al. | 256/26 |
| 4,722,514 | 2/1988 | Pettit | 256/19 |
| 4,944,117 | 7/1990 | Gebhard et al. | 49/57 |
| 5,170,748 | 12/1992 | Watson, Jr. | 119/27 |
| 5,215,290 | 6/1993 | Khalessi | 256/19 |

*Primary Examiner*—Todd E. Manahan
*Attorney, Agent, or Firm*—Edgar W. Averill, Jr.

[57] ABSTRACT

A horse stall gate manufactured from a lightweight polymer. The gate includes a plurality of ventilation slots designed to provide optimum airflow to the horse stall while only nominally reducing the strength of the gate, the slots being sized smaller than the horse's hooves. The gate is formed by rotational molding resulting in a hollow construction in the areas between ventilation slots and greatly reducing the weight. Rotational molding also produces a smooth exterior surface with rounded edges and corners to eliminate the chance of injury from sharps. The gate is reversible so that it may be hinged to either side of a stall doorway and includes a central indent in the upper edge for the horse to lean out of. Finally, the raw material can be provided in any color prior to rotational molding completely eliminating the expense and hazard of paint.

9 Claims, 2 Drawing Sheets

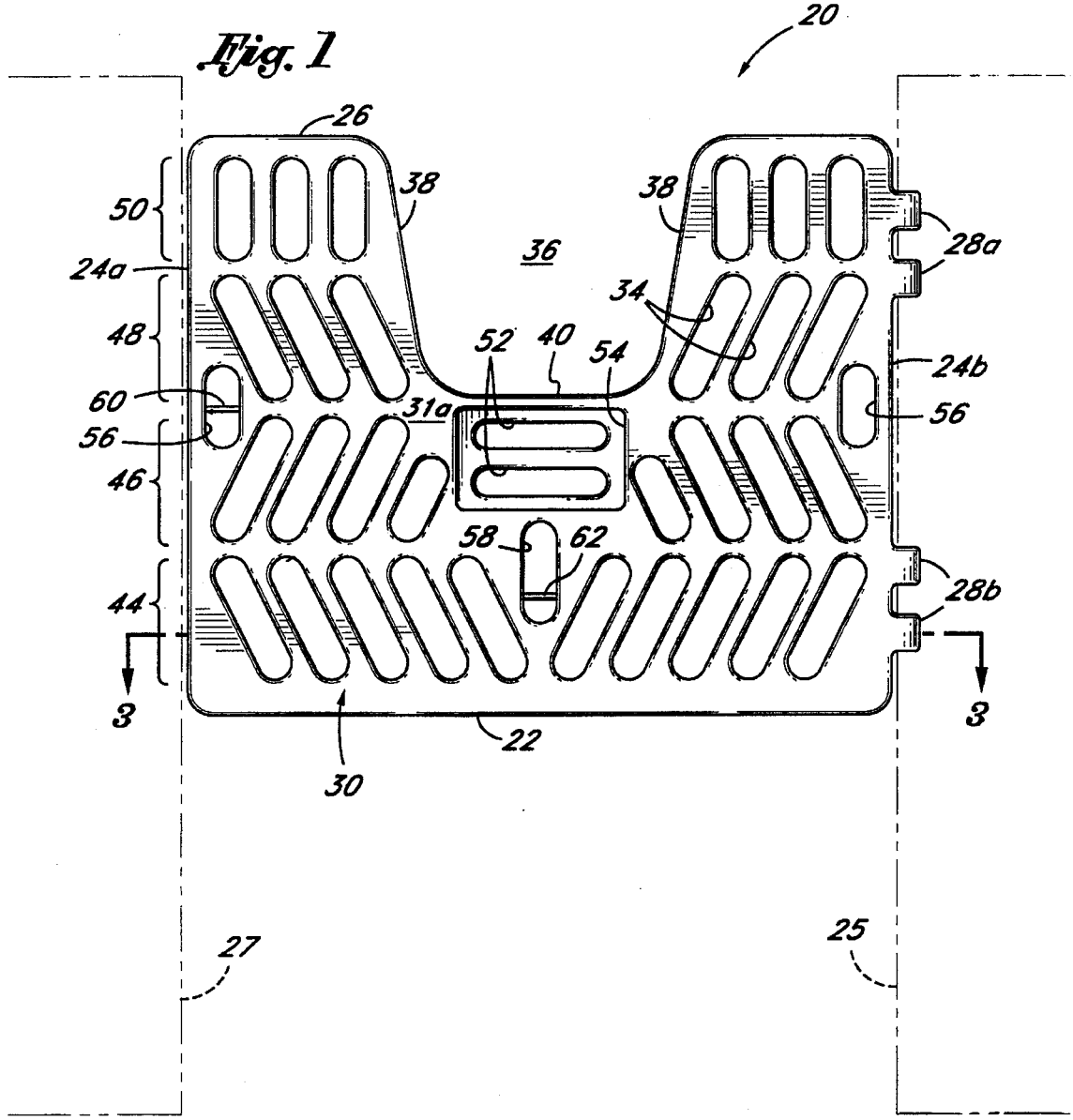
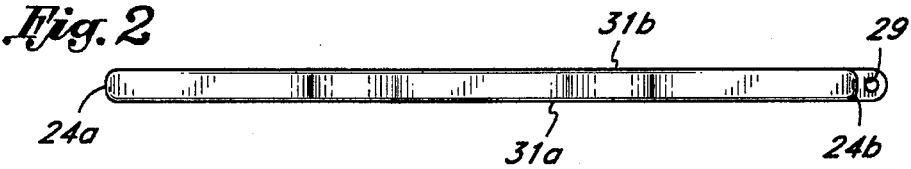
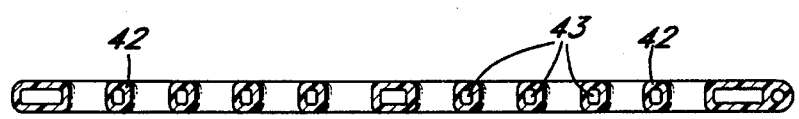

HOLLOW, PLASTIC HORSE STALL GATE

FIELD OF THE INVENTION

The present invention pertains generally to gates for large barn animals and, more particularly, to a lightweight horse stall gate.

BACKGROUND OF THE INVENTION

Horses live much of their lives in a small stall of a barn or stable having three closed sides and an open side secured by a hinged front gate. Being curious animals, and recognizing the direction from which all food, exercise, companionship, etc., originates, horses spend an inordinate amount of time leaning out of their stalls over the front gate. Often, frustration, nervousness, skittishness or just plain boredom compels these animal to chew, kick, lunge into or otherwise abuse their front gate. Unfortunately, the present state-of-the-art horse stall gates do little to safeguard the horse from injury, given that the gates are the focus of so much potentially harmful attention.

Horse stall gates are primarily manufactured cheaply from wood and painted. Wood tends to wear faster in humid climates such as Fla., and especially so when subjected to a horse prone to chewing. Splinters and abrasive surfaces result from the frayed wood which can lead to irritating minor injuries and, in the worst cases, dangerous infection. Moreover, the chipping paint from wood gates presents a chemical hazard if ingested.

Racing horses in particular present a great risk because of their high value. Moreover, the painted gates inevitably fade and must be repainted frequently thus consistently exposing the horses to fresh paint. Ironically, expensive racing horses, often bought and sold as an investment commodity, are needlessly exposed to greater lo levels of potentially toxic paint than their domestic counterparts for the sake of a form of advertising, which is ultimately intended to increase their worth.

A further problem with wood stall gates is their typically solid panel construction making them heavy. The commonly used solid panel construction also renders the wood gates very poor ventilators. In order for horses to keep in good spirits, which takes on added significance for horses before a big race, they must be kept comfortable. A hot and stuffy stall can negatively affect a horse's performance and solid wood gates are often partly to blame.

Some gates have been manufactured from aluminum bars which solves the ventilation problem and results in a relatively lightweight gate. Unfortunately, the aluminum still needs painting, and the wide spacing between bars can present a danger if the horse gets a leg caught in it and frightens. It is common knowledge that a horse with a broken leg can seldom recover to walk, let alone race again.

Thus, there has been a need for quite some time for an improved horse stall gate which solves the deficiencies of prior designs.

SUMMARY OF THE INVENTION

The present invention comprises an improved :;tall gate for animals having a hollow body defined by a bottom edge, a hinged side edge, a second side edge opposite the hinged side edge and an upper edge having a central animal access indent. The stall gate includes a plurality of ventilation slots arranged to allow air flow through the gate and sized too small for an animal within the stall to put a hoof through the slots. Thus, the ventilation slots are distributed over a majority of area of the gate to provide optimum ventilation. The structural portions of the gate between the ventilation slots are hollow to reduce the overall weight of the gate. Preferably, the gate also includes a plurality of hinge pin receiving lugs extending from the hinged side, the lugs each having aligned through-holes for insertion of hinged pins or rods defining an access of rotation of the gate.

In a preferred method of construction of the present gate, the gate is formed of a polymer in a rotational molding process. The polymer is introduced in powder form into a hollow mold and the mold caused to rotate about a multiplicity of axes to cause the powder to contact the inner walls of the mold. The application of heat to the mold causes the powder to melt and fuse together against the inner mold surfaces. The end result is a plurality of hollow legs or bridges between slots defining the entire body of the gate. In the preferred embodiment, the polymer is a low-density linear polyethylene. As an optional addition, one or more small metal rods may be positioned across one or more slots within the mold prior to the rotational molding operation in order to provide latch members for attaching a chain or elastic closure cord.

The animal gate is advantageously molded so that all of the external corners and edges are rounded. Thus, the gate does not present a hazard for animals which might chew or otherwise abuse the gate. Furthermore, a dye may be added to the polymer material prior to the molding process. The gate can thus be formed with a desired color which is essentially wear-resistant. The gate therefore eliminates the need for subsequent painting.

These and other advantages will become apparent from the following description and accompanying drawing.

BRIEF DESCRIPTION OF THE DRAWINGS

FIG. 1 is a front elevational view of a preferred horse gate of the present invention;

FIG. 2 is a top plan view of the horse gate of FIG. 1;

FIG. 3 is a cross sectional view of the horse late taken along line 3—3 of FIG. 1;

DESCRIPTION OF THE PREFERRED EMBODIMENTS

Figure 4:
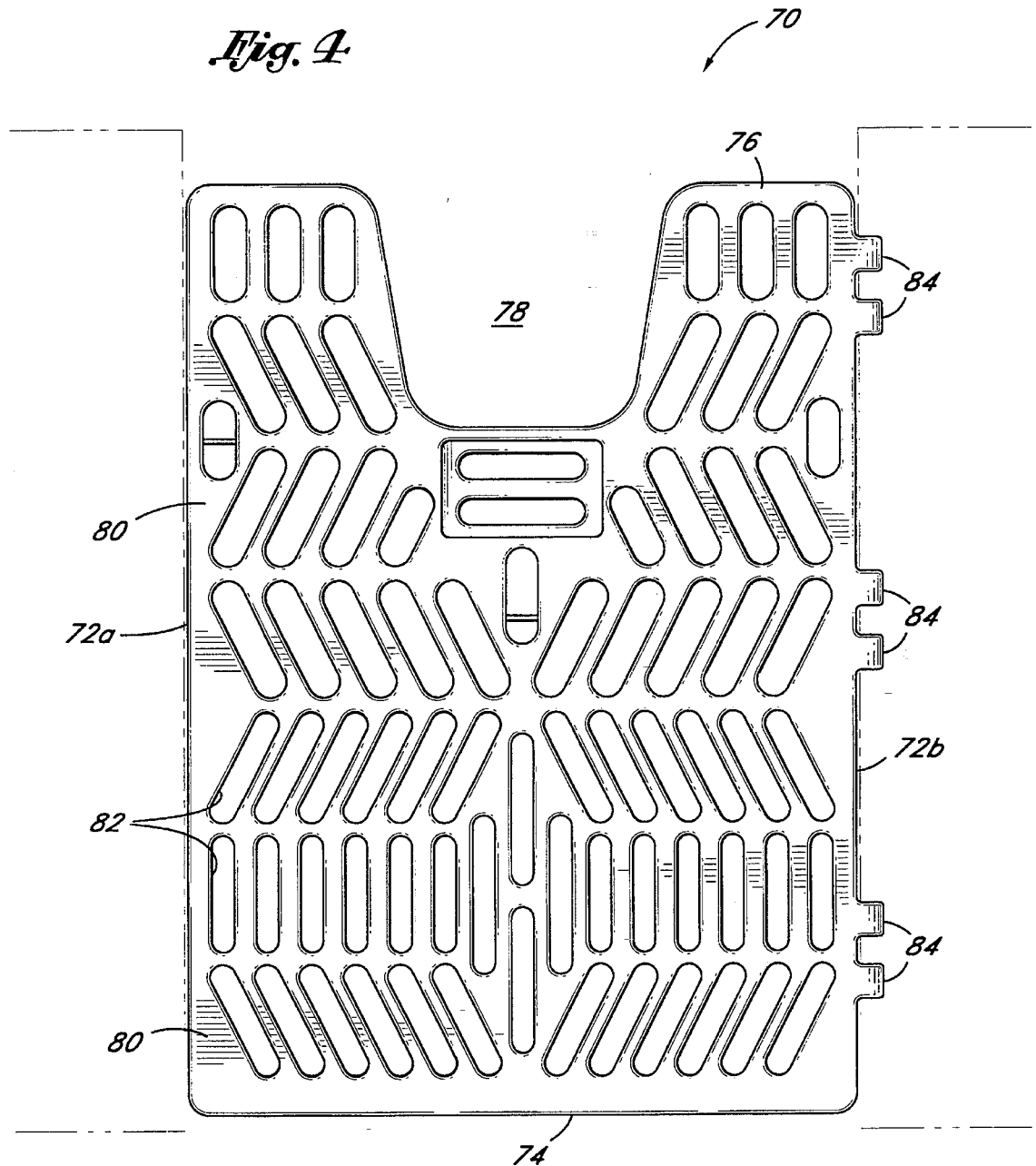
FIG. 4 is a front elevational view of a full-size version of the horse gate of the present invention.

As shown in FIGS. 1 and 2, the peripheral outline of a generally rectangular horse gate 20 of the present invention is defined by a bottom edge 22, a pair of lateral edges 24a, 24b and an upper edge 26. The outline defines front and back faces 31a, 31b, respectively. In this illustration, the fight hand lateral edge 24b includes an upper and lower pair of hinged pin receiving lugs 28 and 28b, respectively. The lugs 28 include vertical through-holes 29 for receiving either short hinge pins or a long hinge rod (not shown) defining the axis of rotation of the horse gate 20. The hinge rod will be mounted vertically to a right door jam 25 so that the gate 20 swings about the rod and contacts an inner surface of a left door jam 27 to provide an inward swinging closure for the stall. The right lateral edge 24b will be referred to as the hinged edge, although the opposite edge might have the extending lugs 28 just as easily. Advantageously, the horse gate 20 can be reversed as the front and back sides 31a, 31b are identical.

The top edge 26 of the horse gate 20 is interrupted by an indent 36 formed by two slightly sloping sides 38 and a horizontal bottom 40. The indent 36 is preferably centered in the horse gate 20 and the sloping sides 38 are separated by a minimum distance at their lower ends, the distance being wide enough for receiving the neck of the horse. The horse gate 20 is mounted so that the bottom 40 of the indent 36 is positioned slightly below the lower neck of the horse in the stall so that the horse may stand on the inside of the horse gate with its neck sticking across to the outside of the horse gate. FIG. 1 illustrates a shortened gate 20 with the bottom edge 22 elevated a few feet above the ground. Thus, in this version, the indent 36 extends approximately halfway from the top edge 26 to the bottom edge 22.

The horse gate 20 generally comprises a rigid body portion 30 defined above by the aforementioned peripheral outline and having a hollow construction. A plurality of ventilation slots 34 formed by connecting: legs 42 are arranged across the entire gate 20 between the peripheral edges. While there is no specific threshold ratio, the area of the ventilation slots 34 desirably comprises between 10% and 90% of the total area of the faces 31*a,b* within the peripheral edges. Preferably, however, the area of the slots 34 comprises between 25% and 75% of the total area of the faces 31*a,b* within the peripheral edges. This construction allows an optimum air flow into the stall through the slots. Further more, a sufficient amount of structure remains to withstand fracture of the gate from bending due to impact from the horse, or from other loading such as that to which the gate may be subjected in transit.

The slots 34 are plentiful and cover a broad area yet each one is sized less than the size of an average horse's hoof. This results in an optimum air flow while preventing injury to the horse from inadvertently getting a leg stuck in the slots. In a preferred form, the slots 34 are elongated and have a major dimension and a minor dimension, the minor dimension being sized smaller than the horse's hoof.

Advantageously, the ventilation slots 34 are arranged to avoid any weak spot in the gate which might otherwise bend plastically upon impact from the horse. Specifically, and with reference again to FIG. 1, a majority of the ventilation slots 34 are distributed in horizontal rows across the gate in a herringbone fashion. Thus, a lower row 44 of slots 34 is angled upward and outward from a vertical centerline (not shown) of the gate 20. A second row 46, just above the lower row 44, slopes upward and inward towards the center of the gate. A third row of ventilation slots 48, again is sloped upwardly and outwardly from the center of gate 20. At the very top of the two portions of the hollow body 30 on either side of the indent 36, a row of vertically disposed ventilation slots 50 is disposed. A pair of adjacent horizontal slots 52 are formed in a central location under the indent 36 and within a rectangular recess 54. The recess 54 may be utilized to mount an identifying plate. Finally, two smaller vertical slots 56 proximate the side edges 24, and a slightly longer central vertical slot 58, fill in regions between the aforementioned angled rows.

The end result of the variously oriented slots is to align the connecting body portions 30 along intersecting axes so that no one axis through the gate is particularly weaker in bending than the others. To illustrate this preferred situation, assume the horse applies a force in the middle causing the gate 20 to bow outward while being braced on both lateral sides 24*a,b* by the stall gate jams 25, 27. The highest stress will be experienced along the vertical centerline where the vertical cross-section is smallest. However, only one slot 58 is aligned along this axis with a sufficient amount of gate material otherwise to resist failure. Thus, the gate 20 is both lightweight and strong. The preferred herringbone fashion of the slots 34 is shown for example only, and other arrangements are possible which likewise avoid weak spots in bending.

As a further preventative measure to lessen the chance of injury to the horse, the present horse gate 20 is manufactured from a durable, non-toxic polymer such as linear low-density polyethylene. This particular material is cited as exemplary only, and other polymers of similar strength and weight may be used. The horse gate 20 is formed utilizing a manufacturing process known as rotational molding. In this process, the polyethylene is introduced into a hollow mold of the horse gate 20 in powder form. The mold is rotated about a multiplicity of axes so as to distribute the powdered polyethylene to the outer walls of the mold. At the same time, heat is preferably applied to cause the polyethylene powder to melt and fuse together. The resulting form is as shown in FIG. 1 with the structural body portion 30 within the peripheral edges being hollow.

Another safety advantage gained with the use of the polyethylene is the ability to mix colored dye in with the powder prior to forming the mold. The ensuing finished product never needs painting thus eliminating; the potential for harm to the horse from paint ingestion. Furthermore, the relative permanency of the color in the gate 20 provides a distinct advantage to painted gates subject to fading. Spills and dirt are easily rinsed off as well.

Advantageously, all of the transitions between the various edges and the indent of the horse gate 20 of the present invention are rounded with relatively large radii to eliminate any sharp protrudences which might injure the creature. Furthermore, each slot 34 has rounded inner edges for safety as well as to facilitate the rotational molding process.

The hollow construction of the horse gate body 30 is best illustrated in FIG. 3. It is thus seen that the regions between the ventilation slots 34 comprise the connecting legs 42 surrounding hollow cavities 43. For superior strength and durability of the load bearing lugs 28, the extending portion defining the lugs is preferably solid rather than hollow. It is readily seen from the cross section of FIG. 3 that the horse gate 20 of the present invention is extremely light weight. FIG. 3, however, clearly illustrates the minimum material through a given cross section of the horse gate 20.

As an optional feature, the gate 20 may include one or more embedded rods to aid in closure. Specifically, as shown in FIG. 1, a small metal rod 60 may be embedded across the left slot 56 and another rod 62 across the central vertical slot 58. The gate being hinged on the right, the rod 60 provides a rigid member about which a locking chain may be looped to affix to the left gate jam 27 in a conventional manner. The other rod 62 in the middle of the gate 20 may be used to hook a bungee cord or other elastic device attached to the right jam 25 to bias the gate closed. The rods are preferably positioned within the rotational mold and :formed in place during the fusing and solidifying process.

Now with reference to FIG. 4, a full-size stall gate 70 is shown. The previous gate 20 had a bottom edge 22 disposed above the ground a few feet and thus was suitable for full-grown horses. The full-size gate, on the other hand, extends all the way to the floor to be suited for all sizes of horses from colts on up. The gate 70 is defined by lateral edges 72*a*, 72*b*, a bottom edge 74, a top edge 76 and an indent 78 for the horse to stick her neck through. The construction of the gate 70 is similar to the first gate 20 with a hollow body 80 having a plurality of elongated slots 82 for weight and ventilation considerations. The full-sized gate 70 includes three sets of hinge lugs 84.

Although the present invention has been described in terms of certain preferred embodiments, other embodiments are possible and the scope of the invention is to be defined by the following claims.

I claim:

1. A stall gate for animals, comprising:

a hollow rigid body formed in a single unitary member having:

a front face;

a rear face;

a peripheral border, said border defined by:

a bottom edge;

a first side edge;

a second side edge generally parallel said first side edge; and an upper edge forming a centered animal neck access indent;

said body being perforated with a plurality of ventilation slots extending from said front face to said rear face allowing air flow through a majority of the gate;

one of said side edges including means for hingedly securing the hollow rigid body to a frame; and said hollow body being formed by a rotational molding process to form a stall gave fabricated from a rigid polymer.

2. The gate of claim 1 wherein said slots cover between 10 and 90 percent of the area within said peripheral border.

3. The gate of claim 2 wherein said slots cover between 25 and 75 percent of the area within said peripheral border.

4. The gate of claim 1 wherein said slots are substantially oval with a major dimension and a minor dimension, said minor dimension being sized smaller than an average adult horse's hoof.

5. The gate of claim 4, wherein said slob are arranged in rows with said major dimension being angled in various directions in adjacent rows.

6. The gate of claim 5, wherein said slots are substantially arranged in a herringbone fashion.

7. The gate of claim 1, wherein said polymer is a linear low-density polyethylene.

8. The gate of claim 1, further comprising a metal rod embedded in said body across one of said slots to provide a support for spring means to urge said body into a closed configuration.

9. The gate of claim 1, wherein said front face and said rear face are identical.

* * * * *